Patented Sept. 29, 1942

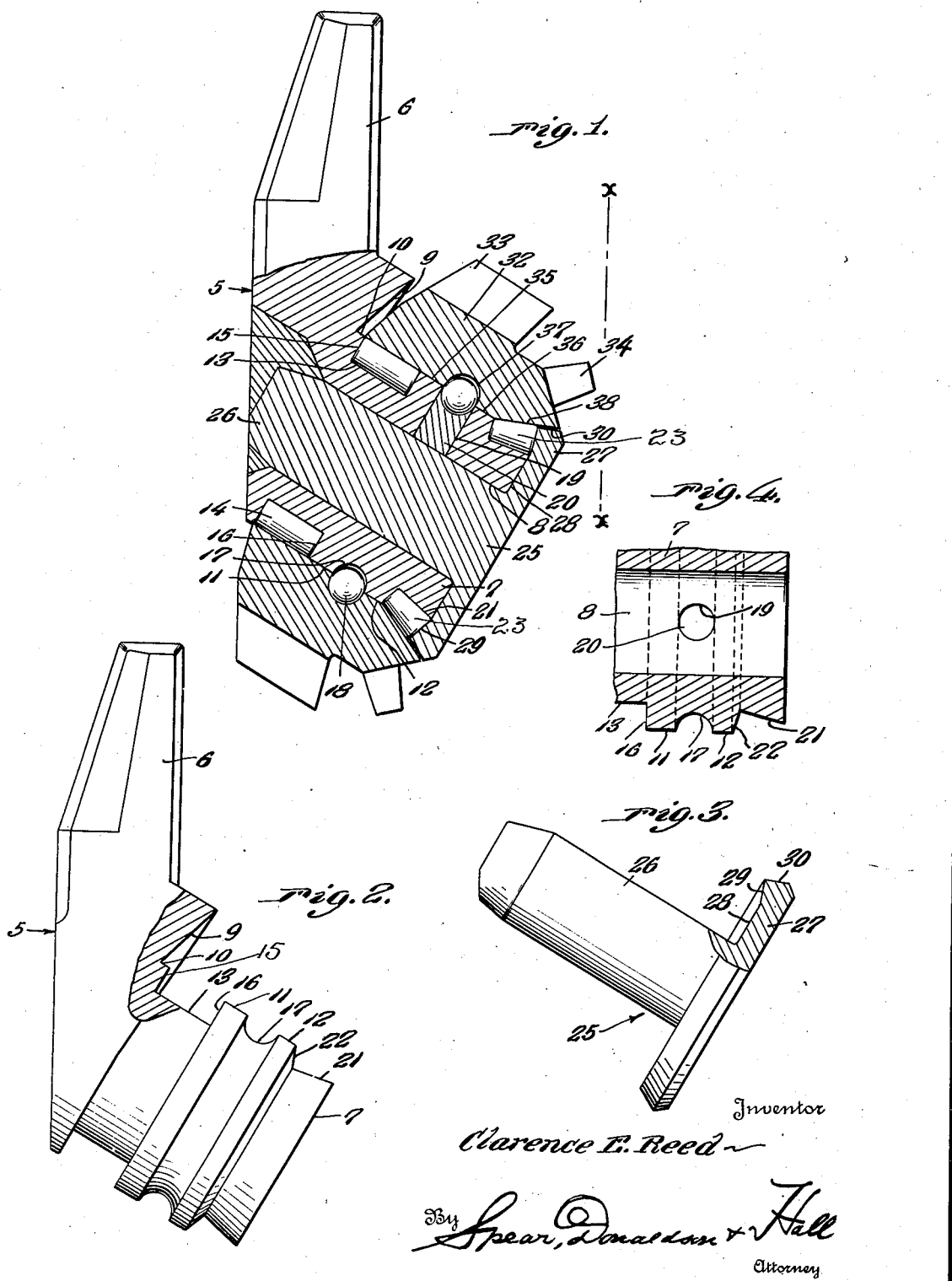

2,297,192

UNITED STATES PATENT OFFICE 2,297,192

EARTH BORING TOOL

Clarence E. Reed, Wichita, Kans., assignor to Chicago Pneumatic Tool Company, New York, N. Y., a corporation of New Jersey Application July 2, 1940, Serial No. 343,639

17 Claims. (Cl. 255—71)

This invention relates to earth boring drills and particularly to a cutter assembly for association in such drills.

It is common to employ in these earth boring drills, one or more rotary cutters disposed outermost from the drill axis to cut at the side of the hole and maintain clearance for the downward passage of the bit head of the drill. Such a side cutter is ordinarily mounted for rotation about an axis which inclines downwardly and inwardly toward the center of the hole. By reason of such location of the cutter and disposition of its axis, it is subjected to heavy operating thrusts acting endwise along the cutter axis, radially of the cutter axis, and also acting to tilt the cutter so as to move it out of alignment with the spindle axis.

This invention provides a bearing arrangement which will adequately sustain these several thrusts upon the cutter. This result is accomplished, together with the elimination of the frictional bearing engagement ordinarily present at one or both ends of the cutter.

In the drawing

Figure 1 is a sectional view through a roller cutter assembly embodying the invention.

Fig. 2 is a side elevation, partly broken away, of the cutter support of the assembly.

Fig. 3 is a side elevation, partly broken away, of the removable spindle portion.

Fig. 4 is a fragmentary view from the interior of the cutter support.

The cutter assembly here shown may be employed in an earth boring tool of the character disclosed in application Serial No. 312,147, filed on January 2, 1940, by Clarence E. Reed. This cutter assembly may, for example, be substituted for the cutter assembly shown in Fig. 14 of application Serial No. 312,147. From the following description of this invention, it will become apparent that the particular formation of the cutter teeth upon the cutter does not have a limiting effect upon the scope of this invention. Thus, the cutter may as well have the toothed formation of Figs. 4, 5, or 13 of application Serial No. 312,147, or still other toothed formations, although the bearing arrangement disclosed is especially useful to sustain the loads imposed by the toothed formation disclosed.

The cutter support 5 is of the character disclosed and claimed in United States Patent No. 2,058,625 to Clarence E. Reed, dated October 27, 1936. This support is attached to the bit head of an earth boring drill by means of the shank portion 6, as is disclosed in said patent. The approximate location of the axis of such a bit head is represented by the line x—x. The support 5 also includes a spindle portion 7 which projects both laterally and downwardly from the shank portion 6. Through this spindle 7 is formed a coaxial bore 8.

At the base end of the spindle 7, the support 5 is undercut, forming a surface 9 extending inwardly of the central part of the support. The spindle itself includes peripheral cylindrical surfaces 10, 11, and 12 which are all of the same diameter, and are concentric to the spindle axis. The cylindrical surface 10 is adjacent the surface 9, and the cylindrical surfaces 11 and 12 are midway along the length of the spindle.

Between the surfaces 10 and 11 the spindle is formed with a groove 13, the bottom wall of which is a cylinder concentric to the axis of the spindle. This groove 13 receives cylindrical roller bearings 14 which are of the same diameter as the depth of the groove, so that the outermost portions of the roller bearings are flush with the adjacent surfaces 10 and 11. The side wall 15 of groove 13 is perpendicular to the spindle axis and intersects the surface 10, and the side wall 16 is also perpendicular to the spindle axis and intersects the surface 11.

Between the cylindrical surfaces 11 and 12 is formed a groove 17 which is of semi-circular cross section. This groove 17 receives ball bearings 18. In order that these ball bearings may be placed in position, a passageway 19 is formed through the wall of the spindle from the bore 8 to the groove 17. This passageway is of the same diameter as the raceway 17 and its opening into the raceway 17 is coincident with the width of the raceway. This opening of passageway 19 should be on the upper side of the spindle.

A plug 20 is provided to fit the passageway 19. The outer end of this plug 20 is grooved so that its surface forms a continuation of the bottom of the groove 17 for the smooth rolling of ball bearings 18. The inner end of plug 20 may be curved to coincide with the surface of the bore hole 8.

At the end of the spindle 7 is formed a groove 21 the bottom of which is of tapered formation and flares outwardly toward the end of the spindle. A tapered surface 22 connects the bottom of groove 21 and the cylindrical surface 12. The groove 21 forms a raceway upon the spindle for tapered roller bearings 23, the large ends of which are disposed at the end of the spindle.

In Fig. 3 is shown the removable spindle section 25 having a stem portion 26 and a flange portion 27. The stem portion 26 fits into the bore hole 8 through the spindle 7, and the flange 27 has an inside face 28 which lies against the end face of the spindle 7. Outwardly of the face 28 is a tapered surface 29 which, when the parts are assembled, is located outwardly from the bottom surface of groove 21. The large end faces of the tapered bearings 23 bear against this surface 29. The periphery of the flange 27 is formed with a tapered surface 30 which inclines inwardly toward and intersects the surface 29.

The cutter 32 may have exterior cutting teeth of any formation and disposition, although the bearing arrangement disclosed is especially useful to sustain the loads imposed by the toothed formation disclosed. The particular construction of these teeth will largely depend upon the teeth disposed upon the other cutters with which this cutter is to be associated in a bit head. As here shown, the cutter has a base row of wide teeth 33, the cutting edges of which approximately define a cylinder, and separated therefrom by a wide groove, a relatively narrow row of teeth 34, the cutting edges of which define a tapered surface inclining inwardly toward the end of the cutter.

Within the bore of the cutter and at the base end thereof is a cylindrical surface 35. When the cutter is in place on the spindle, this surface 35 bears upon the roller bearings 14 and also upon the surface 11 of the spindle. The bore of the cutter also includes a cylindrical surface 36 which bears upon the surface 12 of the spindle. Surfaces 35 and 36 are of the same diameter.

Between the surfaces 35 and 36 is formed a groove 37. The bottom of this groove 37 is of semi-circular formation and is of the same diameter as the ball bearings 18 and the groove 17 of the spindle. The groove 37 is, however, deeper than the radius of the semi-circular surface of the bottom, or, otherwise stated, is deeper than the radius of the ball bearings. The groove 37 is, nevertheless, no wider than the diameter of the ball bearings 18, or the diameter of the semi-circular bottom wall of the groove. That is, the groove 37 includes parallel side walls which extend from the semi-circular bottom surface of the groove to the bore hole through the cutter, so that this groove is of generally semi-oval formation in cross section.

The bore hole of the cutter also includes a tapered surface 38 which extends from the cylindrical surface 36 outwardly to the end of the cutter. This surface 38 is tapered and flares outwardly of the cutter. The inner portion of surface 38 bears upon tapered bearings 23 and the outer portion of surface 38 overlies the surface 30 of flange 27 of the removable spindle section 25.

To assemble the parts, the roller bearings 14 are first located in the groove 13 and the cutter is then passed over the spindle to bring its internal surface 35 upon the cylindrical roller bearings 14 and the surface 11. Next, either the ball bearings 18 or the tapered roller bearings 23 may be positioned in place. The tapered roller bearings 23 are inserted in between the surface 21 of the spindle and the surface 38 of the cutter by passing them over the end of the spindle. The ball bearings 18 are located in place by passing them through the bore hole 8 of the spindle and then up through the passageway 19. After all the ball bearings have been thus located in the grooves 17 and 37, the plug 20 is passed through the bore hole and is located in the passageway 19, it being so turned that its upper end surface is complemental to the bottom of groove 17.

The removable spindle section 25 is last placed in position by inserting its stem 26 through the bore hole 8. It is held in place by welding applied between the end of the stem and the support 5. The stem 26 serves to prevent inward displacement of plug 20.

After the parts are thus assembled, the cutter 32 is prevented from endwise displacement both toward and away from the base of the spindle by the ball bearings 18, these ball bearings being partly in the cutter and partly in the spindle. These ball bearings serve only to take these end thrusts and not radial thrusts of the cutter, and this is assured by the depth of groove 37 of the cutter in excess of the radius of the ball bearings. It will be apparent that this same desired effect may be obtained by making the groove 17 in the spindle of increased depth instead of the groove 37.

The ball bearings 18, in preventing endwise movement of the cutter, maintain the end face of the cutter away from the surface 9 of the support so that no frictional drag upon the cutter will there occur. Also, the cutter does not overlie the surface 10 of the spindle, but terminates short thereof, the end face of the cutter being flush with the ends of the roller bearings 14 at the surface 15. As wear of the ball bearings 18 occurs, the cutter surface 35 may move over and bear upon the surface 10, but it is desired that the surface 9 remain away from the end face of the cutter during the normal operating life of the cutter. At the other end of the cutter, the surface 30 is spaced from the overlying portion of surface 38 of the cutter, so that frictional engagement does not occur between these surfaces.

Radial thrusts of the cutter are sustained by the cylindrical roller bearings 14, the frictional cylindrical surfaces 11 and 12 of the spindle upon surfaces 35 and 36 of the cutter, and by the tapered roller bearings 23. The tapered roller bearings in addition take endwise thrusts of the cutter toward the free end of the spindle. Also, the tapered roller bearings 23 sustain the turning forces imposed upon the cutter tending to turn it about a generally horizontal axis perpendicular to the spindle axis. These turning forces arise from the upward pressure of the ground upon the base row of teeth 33 of the cutter.

It will be observed that in this embodiment of the invention, all of the spindle raceways, namely, for the cylindrical roller bearings 14, the ball bearings 18, and the tapered roller bearings 23, are on the spindle portion 7 of the support 5, the removable spindle section 25 providing only the side wall 29 for the tapered bearings 23. Due to the presence of the grooves 13 and 21 in the spindle, the central part of the spindle providing the bearing surfaces 11 and 12 appears as an enlargement encircling the spindle. It is into this central enlargement of the spindle that the ball raceway 17 is formed.

This bearing structure affords adequate support for the cutter. It fully sustains the end, radial, and tilting thrusts upon the cutter, and this is accomplished although the abutments usually present at the ends of the spindle for engagement with the cutter are eliminated. By eliminating these abutments and the consequent frictional drag upon the cutter, free rolling of the cutter results and a larger cutter life is obtained. The cutter is maintained in coaxial alignment with its spindle, and this condition continues to exist throughout the operating life of the cutter teeth, so that the full gauge of the bore hole is maintained.

A further important feature of the bearing arrangement is the combined axial length of the bearings. The tapered roller bearings 23 are widely separated from the cylindrical roller bearings 14. The bore of the cutter being long in this respect, the thrusts tending to tilt the cutter are more adequately sustained. This bore is greater in length than the horizontal dimension of the width of the annular area cut by the teeth of the cutter.

I claim:

1. A roller cutter for an earth boring drill having a bore extending through the cutter, a raceway for cylindrical roller bearings in one end of said bore, a groove of elliptical form in the central portion of the length of said bore, and a tapered raceway at the other end portion of said bore.

2. A roller cutter according to claim 1, having a row of cutting teeth of substantial length of cutting edge on the exterior surface outwardly of the cylindrical raceway in the bore, and a relatively narrow row of teeth on the other end portion of the said exterior of the cutter outwardly of said tapered raceway in said bore.

3. A rolling cutter for an earth boring drill having a cylindrical raceway in a bore of said cutter and a relatively wide toothed cutting surface on said cutter outwardly of said cylindrical raceway relative to the axis of the cutter, a tapered raceway at the other end of said bore, and outwardly of said tapered raceway a relatively narrow toothed cutting surface on said cutter inclined to said relatively wide cutting surface.

4. A rolling cutter according to claim 3 in which a wide groove is positioned in the cutting surface between said cutting teeth.

5. A cutter assembly comprising a roller cutter for an earth boring drill having a bore extending through the cutter, a raceway for cylindrical roller bearings in one end of said bore, a groove of semi-oval cross-section in the central portion of the length of said bore, and a tapered raceway at the other end portion of said bore, and a spindle having corresponding raceways, a groove in the spindle registering with the groove in said cutter, cylindrical roller bearings, tapered roller bearings, balls in said groove, and said spindle having a shoulder at the large end of the tapered raceway.

6. A cutter assembly according to claim 5 in which said spindle includes a removable section and said shoulder is on said removable section.

7. A spindle for a roller cutter of an earth boring drill having a raceway for cylindrical roller bearings at one end portion of the spindle length, a tapered raceway at the other end portion of said spindle, a shoulder on said spindle at the larger end of said tapered raceway, and a groove of semi-circular cross-section for ball end thrust bearings intermediate the cylindrical and tapered raceways.

8. A spindle according to claim 7 having cylindrical frictional bearing surfaces thereon on both sides of said groove of semi-circular cross-section.

9. A roller cutter for an earth boring drill having a bore extending therethrough, said bore being of cylindrical formation from one end of the cutter to a point within the cutter, and then being of tapered formation flaring outwardly to the other end of the cutter, said bore also including a groove of generally semi-circular cross-section in the cylindrical portion of the bore surface.

10. A cutter assembly for earth boring drills comprising a support having a spindle projecting laterally downwardly from a side face of the support, a roller cutter rotatably mounted upon said spindle, a row of ball bearings between the cutter and the spindle midway of their lengths, approximately half of each ball being in the spindle and half being in the cutter so that the balls sustain end thrusts upon the cutter, a row of cylindrical roller bearings between the cutter and spindle and located between the support and said row of ball bearings, and a row of tapered roller bearings between the cutter and spindle and located on the other side of said ball bearings, said side face of said support being spaced from the adjacent face of the cutter to eliminate frictional drag between them.

11. A spindle and support for an earth boring drill cutter, said spindle projecting from a face of said support, a roller cutter on said spindle spaced from the face of said support, rolling bearings between said spindle and said cutter and ball end thrust resisting bearings in complementary raceways forming a channel oval in cross-section and deeper than wide between said cutter and said spindle.

12. A spindle and cutter for an earth boring drill having bearing surfaces for two sets of roller bearings and complementary raceways forming a channel oval in cross-section and deeper than wide for ball end thrust and cutter retaining means, said spindle having a longitudinal bore, said spindle having a secondary bore in said spindle for inserting balls into said groove, a plug for said secondary bore, a plug for said longitudinal bore providing a flange for the end of said spindle.

13. In an earth boring drill, a spindle, a cutter rotatably mounted thereon, a pair of complementary registering grooves on the periphery of the spindle and on the interior of the cutter, respectively, combining to form a raceway, a set of ball bearings in said raceway, said combined raceway having a width substantially equal to the diameter of the balls, whereby the balls sustain thrusts lengthwise of the cutter axis, said combined raceway having a depth considerably in excess of the diameter of the balls, whereby the balls are prevented from sustaining thrusts in a direction radial to the cutter.

14. In an earth boring drill according to claim 13, the spindle axis being inclined whereby the cutter is subjected to both radial and longitudinal thrusts of considerable magnitude, and roller bearing means provided between the cutter and spindle for sustaining the radial thrusts.

15. A spindle for a roller cutter of an earth boring drill having a groove providing a cylindrical raceway surface for roller bearings, a tapered raceway surface and a groove of semi-oval cross-section deeper than half its width for ball bearings.

16. A spindle for a roller cutter of an earth boring drill having raceways for roller bearings and a groove of semi-oval cross-section formed around the spindle deeper than half its width to receive ball bearings.

17. A spindle having roller bearing raceways, and a ball raceway, a cutter upon said spindle, said cutter having a bore longer than the width of the toothed cutting surface of said cutter, said spindle being longer over all than the bore of said cutter whereby the end faces of the cutter are axially spaced from any opposing spindle surfaces at the ends of the spindle, roller bearings on said roller bearing raceways, and in said ball raceway, a row of ball bearings between said spindle and said cutter, said ball raceway being of oval cross-section whereby the ball bearings are relieved of radial loads and take end thrusts only.

CLARENCE E. REED.